United States Patent [19]

Toral et al.

[11] Patent Number: 5,363,962
[45] Date of Patent: Nov. 15, 1994

[54] MULTIPACK FOR MAGNETIC TAPES WOUND ONTO HUBS

[75] Inventors: Jose Toral; Hermann Brandstetter, both of Munich; Gottfried Lutz, Seefeld; Hartmut Thiele; August Liepold, both of Munich, all of Germany

[73] Assignee: BASF Magnetics GmbH, Mannheim, Germany

[21] Appl. No.: 113,356

[22] Filed: Aug. 30, 1993

Related U.S. Application Data

[60] Division of Ser. No. 38,083, Mar. 29, 1993, abandoned, which is a continuation of Ser. No. 744,742, Aug. 14, 1991, abandoned.

[30] Foreign Application Priority Data

Aug. 16, 1990 [DE] Germany ............... 4025906
Aug. 16, 1990 [DE] Germany ............ 9011867[U]

[51] Int. Cl.$^5$ ........................................ B65D 85/672
[52] U.S. Cl. ............................... 206/394; 206/303; 206/408; 206/415; 206/586
[58] Field of Search .......... 206/303, 310, 395, 397, 206/408, 413, 415, 416, 493, 491, 394, 586; 229/40

[56] References Cited

U.S. PATENT DOCUMENTS

| | | | |
|---|---|---|---|
| 1,691,995 | 11/1928 | Saulter | 206/385 |
| 1,809,267 | 6/1931 | Cushing | 206/415 |
| 2,101,355 | 12/1937 | Wonder | 206/302 |
| 3,059,763 | 10/1962 | Eifrid | 206/395 |
| 3,314,586 | 4/1967 | Frank, Jr. | 206/303 |
| 3,319,866 | 5/1967 | Kitchell | 206/303 |
| 3,454,155 | 7/1969 | Voissem et al. | 206/408 |
| 3,543,922 | 12/1970 | Charlton et al. | 206/62 |
| 3,587,840 | 6/1971 | Hultberg | 206/395 |
| 3,738,563 | 6/1973 | Eifrid | 206/491 |
| 3,974,914 | 8/1976 | Cross et al. | 206/408 |
| 4,122,945 | 10/1978 | Borzak | 206/395 |
| 4,140,218 | 2/1979 | Forte | 229/40 |
| 4,616,469 | 10/1986 | Skalleberg | 206/395 |
| 4,700,839 | 10/1987 | Fujii | 206/303 |
| 4,708,246 | 11/1987 | Minion | 206/394 |
| 4,792,044 | 12/1988 | Nishizawa et al. | 206/303 |
| 4,851,286 | 7/1989 | Maurice | 206/586 |
| 4,883,178 | 11/1989 | Thiele et al. | 206/394 |
| 4,883,179 | 11/1989 | Dionne | 206/586 |
| 4,901,856 | 2/1990 | Thiele | 206/397 |
| 4,944,407 | 7/1990 | Thiel et al. | 206/628 |
| 4,955,471 | 9/1990 | Hirose et al. | 206/394 |
| 4,988,001 | 1/1991 | Brandstetter et al. | 206/394 |
| 5,043,974 | 8/1991 | Nakagawa | 206/586 |

FOREIGN PATENT DOCUMENTS

| | | | |
|---|---|---|---|
| 0424763 | 5/1991 | European Pat. Off. | |
| 527923 | 10/1940 | United Kingdom | 206/395 |
| 2031834 | 4/1980 | United Kingdom | 206/309 |

*Primary Examiner*—David T. Fidei
*Attorney, Agent, or Firm*—Keil & Weinkauf

[57] ABSTRACT

Parallelepipedal packaging containers, suitable for return transport, for wound-up magnetic recording media, produced from a one-part or multi-part blank having a bottom and top as well as side parts, which are joined to one another by means of foldable joining tabs and containing a hub support extending from the top to the bottom. The bottom and the top each have a circular central clearance through which a one-part or multi-part hollow-cylindrical hub support is inserted, onto which the wound media are fitted in a stackable manner. For assembly of the package from the folded-up state, the hub support has a locking snap-in device on at least one end face.

5 Claims, 8 Drawing Sheets

FIG. 10

MULTIPACK FOR MAGNETIC TAPES WOUND ONTO HUBS

This application is a File Wrapper continuation (37 CFR 1.62) of U.S. application Ser. No. 08/038,083, filed Mar. 29, 1993, now abandoned, which is in turn a File Wrapper continuation of U.S. application Ser. No. 744,742, filed Aug. 14, 1991, now abandoned.

BACKGROUND OF THE INVENTION

1. Field of the Invention

The invention relates to a parallelepipedal packaging container for magnetic recording media wound up onto hubs provided with internal bores (known as pancakes), produced from a one-part or multi-part blank, having a bottom part, top part and side parts, which can be joined to one another by means of foldable joining tabs and the hubs being stacked one on top of the other on a hub support.

Large quantities of what are known as pancake packs are sold worldwide by the magnetic tape producers. In these packs, the magnetic tape is wound up onto hubs, for example flangeless hubs, either what are known as NAB hubs or stackable hubs according to U.S. Pat. No. 4,081,151 or others. At present, these pancakes are packed either individually or in multipacks and covered with a shrink film or held by various types of cardboard box.

The disadvantage of the individual pack is that a great deal of packaging material has to be used.

2. Description of the Related Art

A multipack comprising a one-part blank is known, for example, from DE-U-8 815 897. This pack has the disadvantage that, if the content comprises pancakes stacked one on top of the other, it is not packed in such a way as to prevent slipping or damage during transit. Other magnetic tape packs are disclosed by the publications U.S. Pat. No. 3,543,922, U.S. Pat. No. 4,708,246, EP 0 320 751, DE-U 8 900 709, DE-U 8 912 747 and DE-U 8 912 749. These packs consist either of relatively voluminous Styropor, which means that for transport they are bulky to no useful effect and has to be disposed of once the content has been unpacked, or the pack is held together by plastic pallets and sleeves, the sleeves being of a relatively complicated design and the side parts of the packed product in some cases being inadequately protected since they are covered only by a film shrink-fitted over the pack. Therefore, this pack has to be additionally placed into an outer case for transport.

SUMMARY OF THE INVENTION

Therefore, it is an object of the present invention to find a pack for pancakes of the generic type mentioned above which at the same time meets the following conditions:
  simple, inexpensive design
  protects the pancakes during transit
  simple to assemble and unpack
  not bulky
  reusable or recyclable
  no additional outer packaging necessary.

We have found that this object is achieved by a pack having the features specified in the defining part of the claims. Further developments of the invention emerge from the drawings and the description.

BRIEF DESCRIPTION OF THE DRAWING

The invention is explained in further detail below with reference to the drawings, in which.

DESCRIPTION OF THE PREFERRED EMBODIMENTS

FIG. 1 a depicts a two-part blank for the pack, comprising a bottom part (1) with side parts (3), connected by means of fold lines, as well as joining tabs (21) and a top part (2). Bottom part and top part each contain a circular central clearance (4) for the hub sleeve to be inserted through.

Figure 1A:
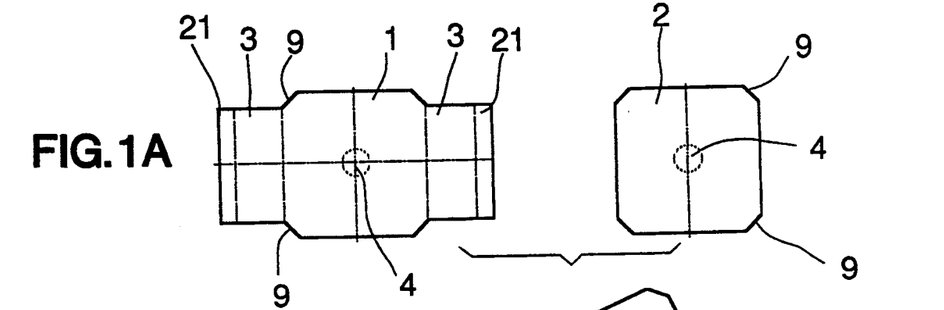
FIGS. 1–4 show various embodiments of a two-part blank for the pack according to the invention.
Figure 1B:
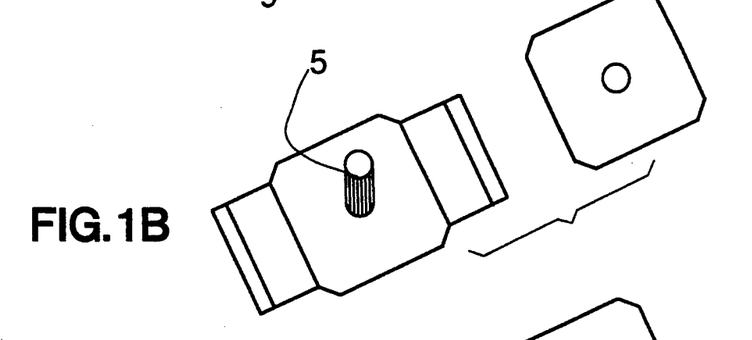
Figure 1C:
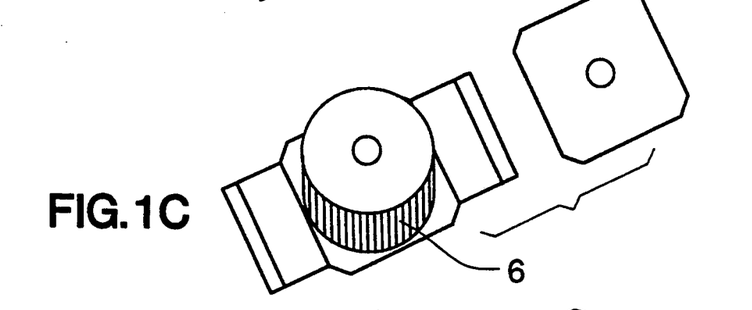
Figure 1D:
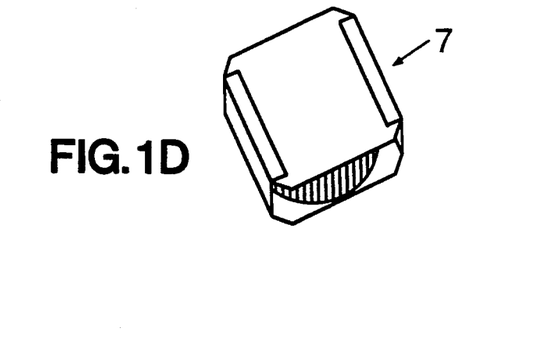

In FIGS. 1b to 1d, the step-by-step assembly of this pack is described. As can be seen from FIG. 1b, the hub sleeve (5), to be described in further detail later, is inserted through the central hole (4) in the bottom part, after which (FIG. 1c) the magnetic recording media wound up onto flangeless hubs are stacked one on top of the other, the surfaces of the rolls resting one on top of the other with virtually no distance in between. Once the required number of pancakes (6) have been stacked one on top of the other, the top part is placed on top, the side parts (3) are folded up and the joining tabs (21) are folded over and, as described in detail later, joined to the top part. Finally, a fastening ring (14) is also placed over the hub sleeve (5). Subsequently, a plastics film may also be shrunk-fitted, as known from the prior art, over the pack (7) thus produced. The edges (9) of the bottom part and of the top part are preferably beveled, so that an octagonal outer surface is produced, which facilitates even drawing-on of the shrink film.

Figure 2:
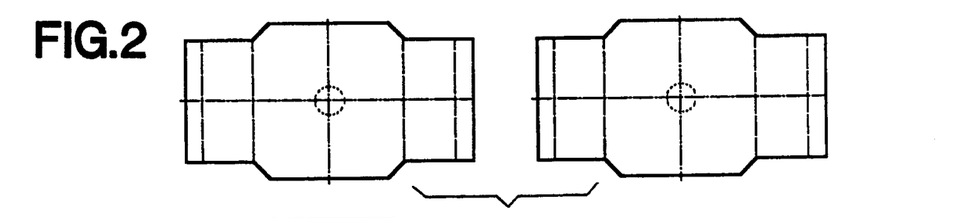
Figure 3A:
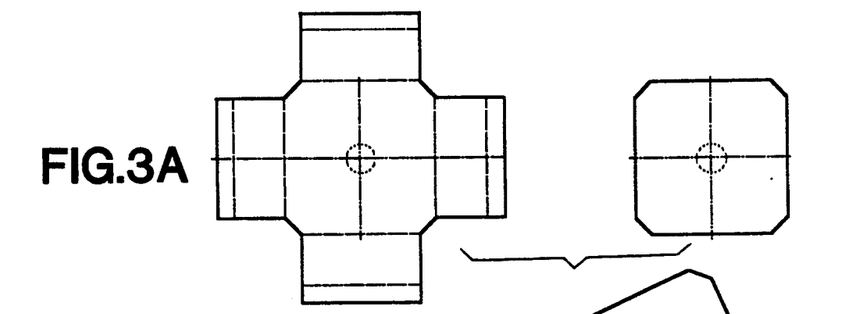
Figure 3B:
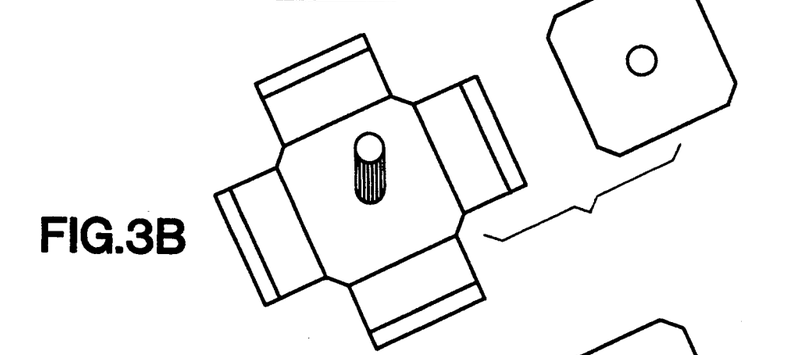
Figures 3C, 3D:
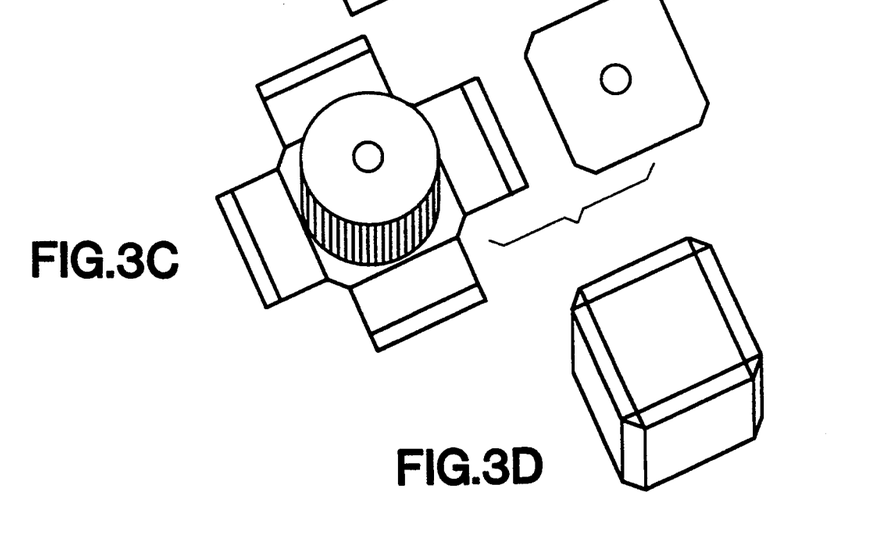

FIG. 2 shows a bottom part and a top part, which are in each case provided with two side parts and the corresponding joining tabs, so that in assembly of the pack all four sides are covered and protected by side parts.

FIGS. 3a to 3d show a further design of a two-part blank, in which all four side parts are attached to the bottom part and in which the top part accordingly has no side parts. The figures reveal how this pack is assembled.

Figure 4:
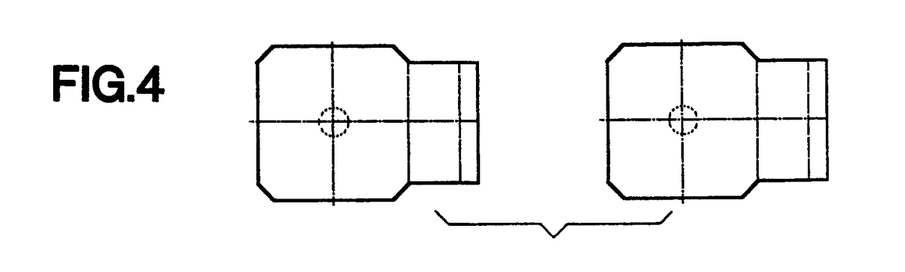
Figure 5A:
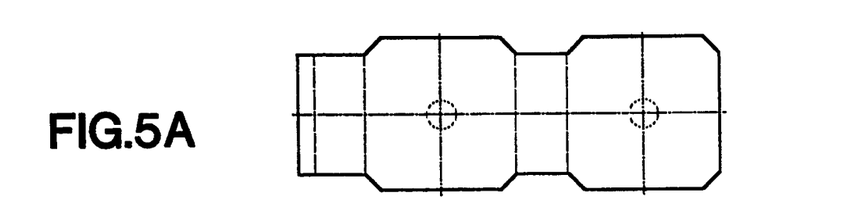
FIGS. 5–6 show corresponding one-part blanks.
Figure 5B:
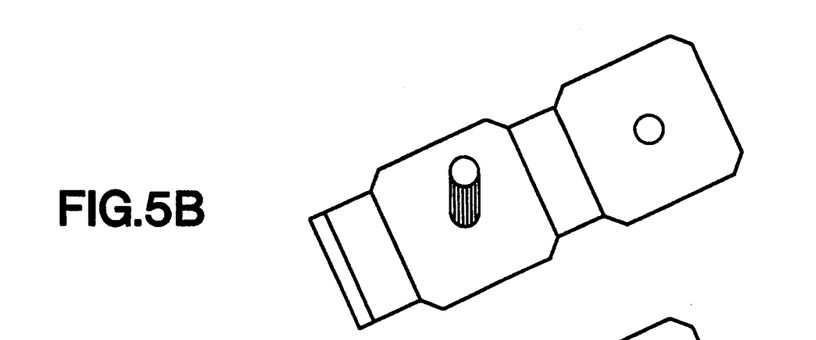
Figure 5C:
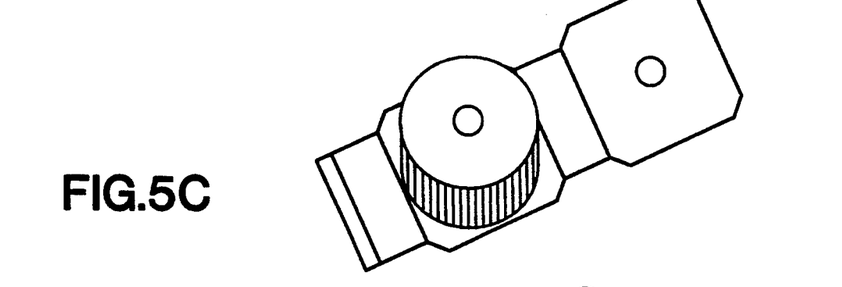
Figure 5D:
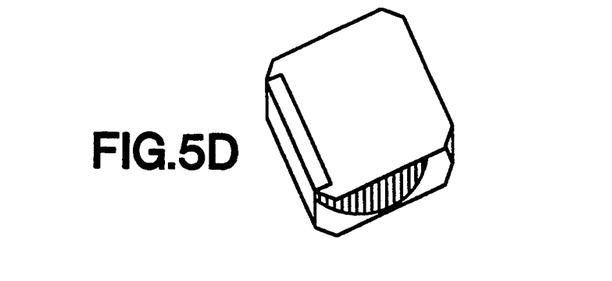
Figure 6A:
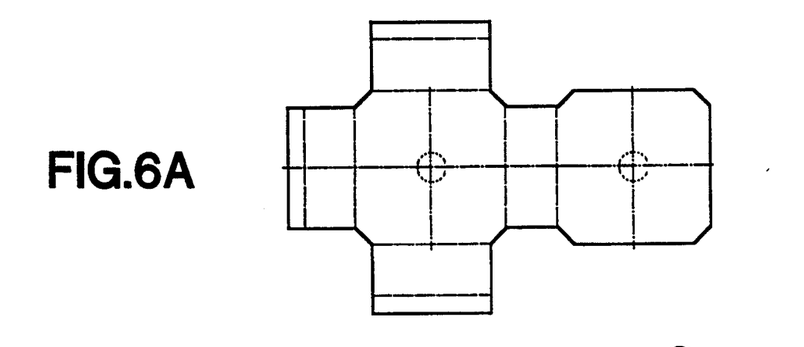
Figure 6B:
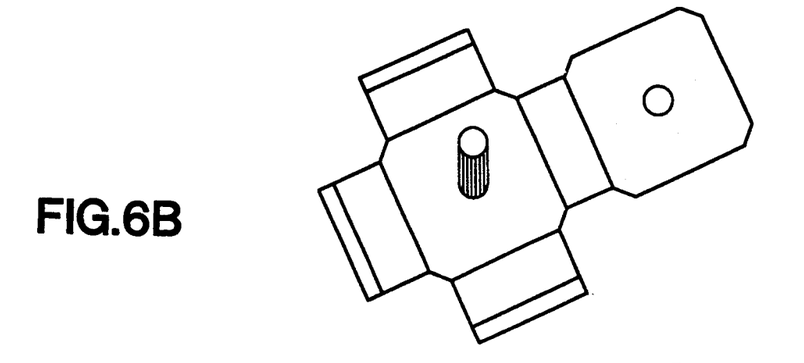
Figure 6C:
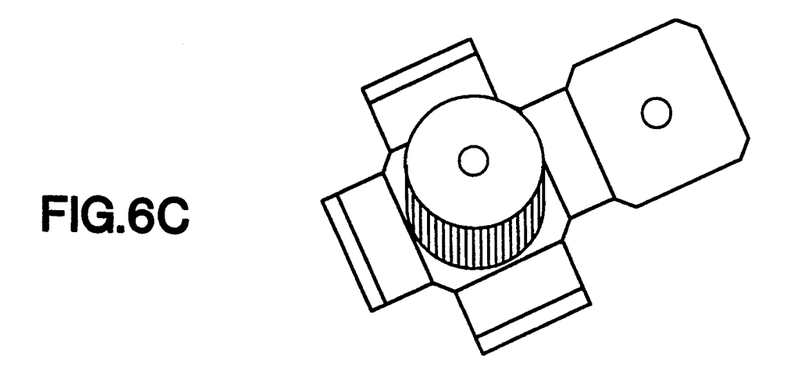
Figure 6D:
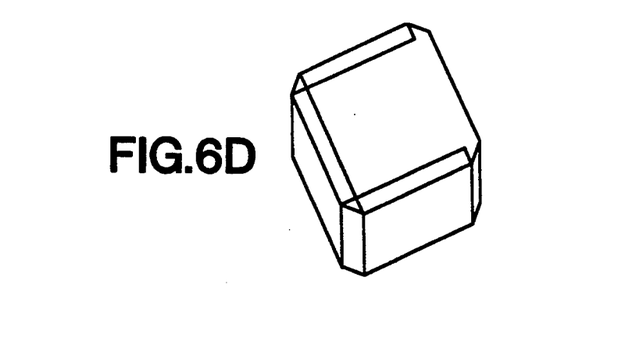

FIG. 4 shows another embodiment, in which the bottom part and the top part are each connected to a side part and a joining tab.

FIGS. 5a to 5d show the design and assembly of a one-part blank, the bottom part being connected to two side parts and at the same time the top part being attached to one side part. The assembly of this pack, in which two sides remain open, is revealed by the other figures.

In the case of FIGS. 6a to 6d, the bottom part is connected to four side parts and one of these four side parts is connected to the top part.

Figure 7:
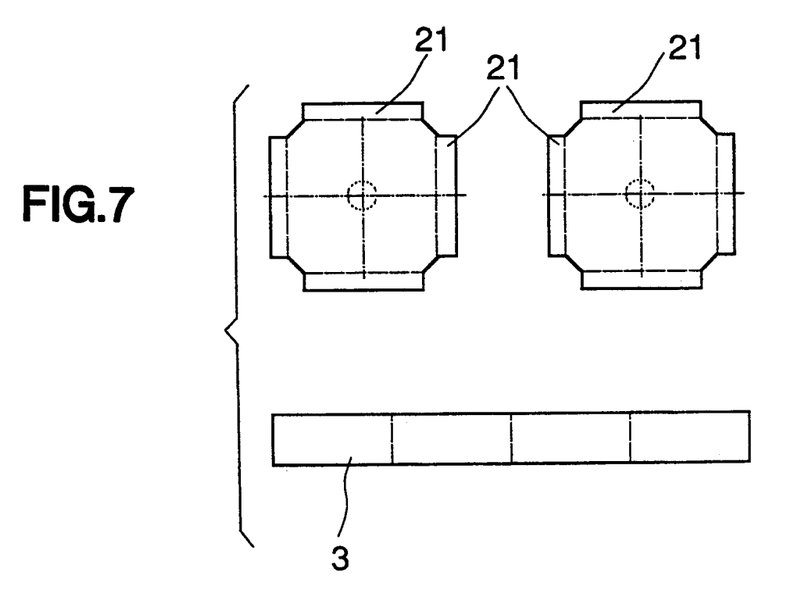
FIG. 7 shows a corresponding three-part blank.

In FIG. 7, bottom part and top part are each provided with four joining tabs (21), the side part (3) in this case being composed of a rectangular tab provided with three fold lines. In assembly of the pack, the joining tabs of bottom part and top part are folded up, the side part is laid over the three corners in folded form and, once the pancakes have been put in, the pack is assembled.

It is readily evident to any person skilled in the art that further subcombinations of blanks are also conceivable.

Figure 8:
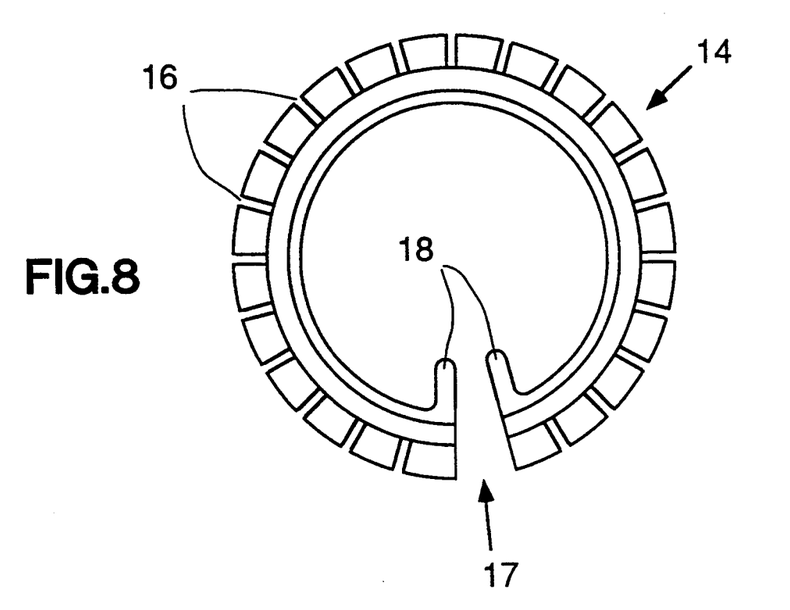
FIGS. 8–10 show a preferred design for the hub sleeve and the snap device.
Figure 9:
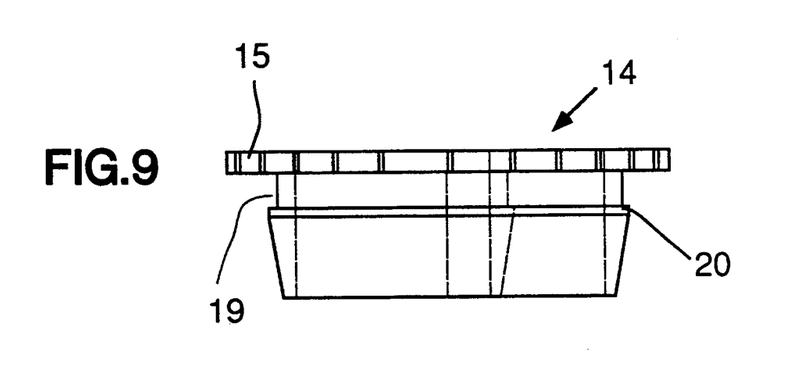
Figure 10:
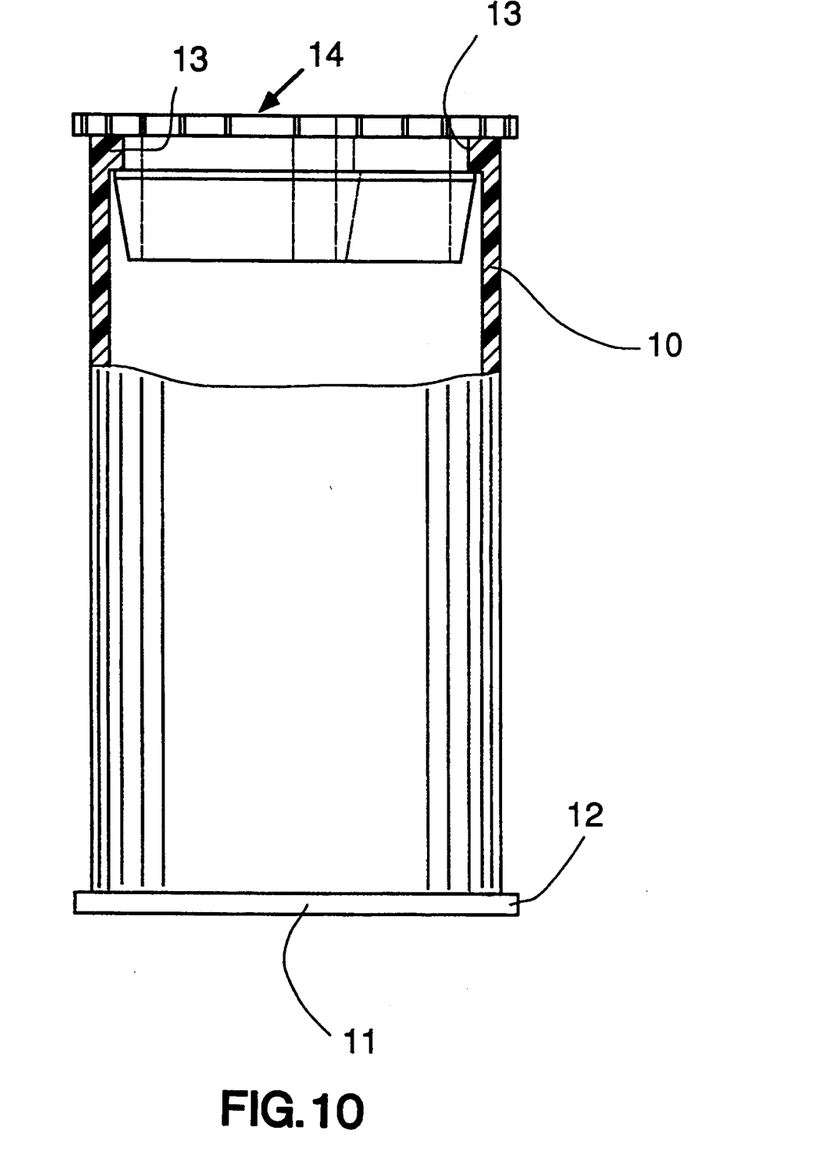

The design of the hub sleeve essential for the invention is revealed by FIGS. 8 to 10. In a preferred design, the hub sleeve is of two parts. It comprises a hollow-cylindrical component piece (10), which is integrally terminated at one end by a cover (11) with protruding rim (12). The other, open end is provided on the inside with a peripheral thickened edge (13), behind which a hollow-cylindrical snap ring (14) engages in a snapping-in manner as the second component of the hub sleeve.

The snap ring (14) is, as already stated, preferably made hollow-cylindrical. It has at its one end a circular ring (15), the periphery of which protrudes beyond the hollow-cylindrical body as in the case of the closed end of the hub sleeve. The circular ring is provided with a plurality of substantially radially running indentations (16) at least over part of its circumference. It has an open point (17), radially inwardly running gripping lugs (18) for snap actuation being provided on both sides of the opening. The cylindrical surface of the snap ring (14) has, adjoining the ring (15), a peripheral groove (19), which is adjoined in the axial direction by a thickening (20), which is beveled, running conically inward to the end of the hollow cylinder. The axial length of the groove (19) corresponds to the axial length of the thickening (13) of the hub sleeve.

In assembly of the pack, as already described above, first of all the bottom part (1) is pressed onto the hub sleeve until the protruding cover (12) makes contact and, after putting in the product to be packed, the pancakes (6), the top part is placed on top, and the resiliently compressible snap ring (14) is placed onto the open end of the hub sleeve and locked with the latter by releasing the gripping lugs (18).

A further solution, not shown in the drawings, is provided by the hub sleeve being open on both sides and provided on the inside of both ends with an edge-like thickening (13), into which two snap rings (14) engage on both sides, as described above.

Similarly, a one-part design of the hub sleeve (5) is also possible, said sleeve having connected to it at its open end a plurality of snap elements which, after assembly of the pack (7), can swing outward and in this way ensure the holding together of the pack.

In a preferred design, the bottom part, the top part and the side parts consist of cardboard; the sleeve consists of plastic, for example of polystyrene. In another design, all the parts of the pack according to the invention consist of plastic.

In assembly of the pack, bottom part, top part and side parts are bonded together by means of the joining tabs, for example by an adhesive layer applied to the joining tabs, which provides the adhesion when folding up by means of heat or sealing.

Similarly suitable for joining the bottom, side and top parts are fastening adhesive strips.

Figure 11:
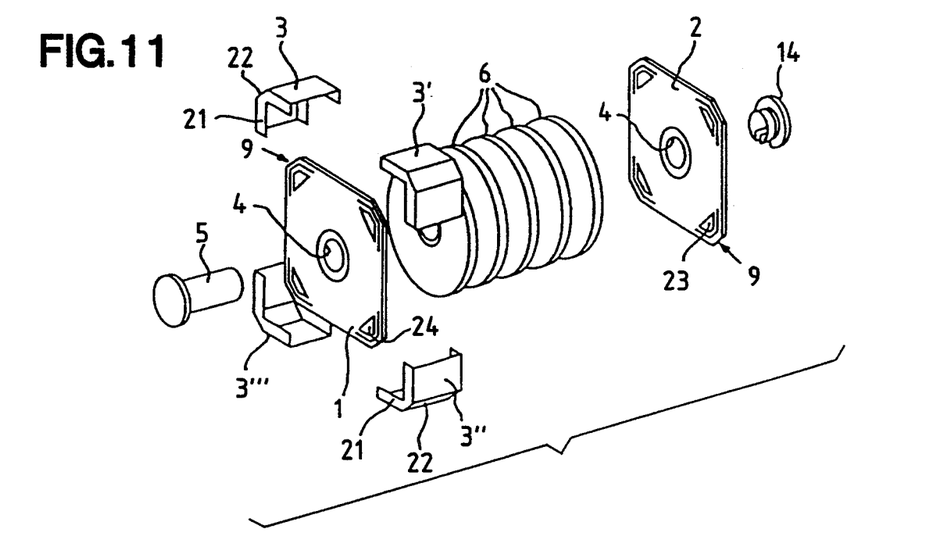
FIG. 11 shows an exploded perspective representation of another embodiment of the packaging container.

Another embodiment of a packaging container according to the invention can be seen in FIG. 11, comprising a bottom part (1), a top part (2), four side parts (3, 3', 3", 3''') as well as a hub support (5), which in a preferred design of the invention interacts in two parts with a snap ring (14).

The design and function of the said parts are explained in further detail below.

Bottom part and top part are identically designed as a square panel with a circular central opening (4), the diameter of which corresponds to the diameter of the internal bore of the hubs for winding up the pancakes (6). The four corners of the square panels described are preferably beveled (9). Furthermore, in a preferable way the insides of the bottom part (1) and top part (2) have triangular projections (23), which are impressed into the panel and are adjacent to the corners (9). In this way, these projections (23) bound the inner space of the packaging container (7) in which the pancakes (6) are stacked one on top of the other.

Correspondingly shaped depressions (24) lie opposite the projections (23) on the respective outsides of the bottom part and top part.

Furthermore, the pack comprises four identically designed side parts (3, 3', 3", 3'''). These are orthogonal open angles, of which the edge (22) is beveled similarly to the corners (9) of the bottom part and the top part. On their two side legs, the side parts (3, 3', 3", 3''') have on both sides side tabs (21), which run parallel to the bottom part or top part respectively. As can be seen from FIGS. 11 and 12, in assembly of the packaging container according to the innovation the four side parts are pushed over the four edges of the bottom part and the top part as well as of the pancakes (6) located between them and in this way already have the effect of holding together the packaging container according to the innovation. For this purpose, the width of the four side parts corresponds to the height of the assembled packaging container.

Figure 12:
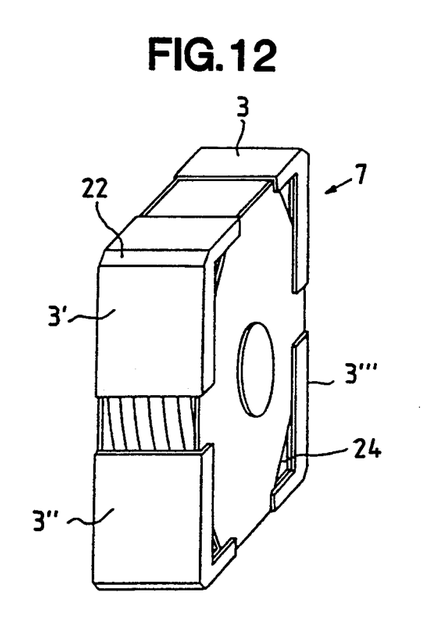
FIG. 12 shows a perspective representation of the completely assembled packaging container according to FIG. 11.

In assembly of the pack, as already described above, first of all the bottom part (1) can be fitted onto the hub sleeve until the protruding cover (12) makes contact and, after fitting on the product to be packed, the pancakes (6), the top part (2) is placed on top, and the resiliently compressible snap ring (14) is placed onto the open end of the hub sleeve (5) and locked with the latter by releasing of the gripping lugs (18), after which, as already described, the four side parts (3, 3', 3", 3''') can be fitted over the edges.

Subsequently, a plastics film may also be shrink-fitted, as known from the prior art, over the pack (7) thus produced. Preferably, the corners of the bottom part and top part as well as of the side parts are beveled, so that an octagonal outer surface is produced, which facilitates the even drawing-on of the shrink film.

Figure 13:
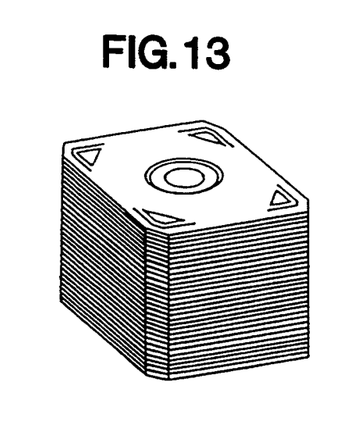
FIG. 13 shows bottom parts and top parts of the packaging container according to FIG. 11 stacked one on top of the other for return transport.

In a preferred design, all the parts of the pack according to FIGS. 11–13 consist of plastic.

It is apparent from the foregoing that unpacking the packaging container according to the present invention requires only a few manipulations. Similarly, it is also readily evident from the design described that the parts used, in particular bottom part and top part, are suitable for return transport after unpacking, in a space-saving and cost-saving way.

As evident for example from FIG. 13, the panels are expediently laid one on top of the other in such a way that the projections (23) adjacent to the corners (9) in each case enter into recesses (24) of the next panel, so that in return transport the panels lie one on top of the other with virtually no distance in between.

If appropriate, the hub sleeve may be granulated and reused. The hub sleeve produced from plastic may be blow-molded, thermoformed or injection-molded. The materials which are suitable, for example polystyrene, are known to any person skilled in the art.

The object mentioned at the outset is achieved completely by the packaging container according to the innovation. A further advantage obtained is that the complete pack with a plurality of pancakes stacked one on top of the other can be pushed as a whole into a known degausser to demagnetize the magnetic recording media, which was not possible with the previously known Styropor packs.

We claim:

1. A parallelepipedal packaging container, defining an inner space, for a number of magnetic recording media wound-up onto hubs with each hub having a central bore, said container comprising a bottom part and a top part, each said part having a central opening, and a central support means, having one closed end with a protruding rim and one open end, for penetrating through said central openings of said bottom and top parts and said central bores of said number of wound-up recording media when being positioned one on top of the other between said bottom and top parts, said central support means accepting at its open end a fastening ring so that, when the central support means and fastening ring are fastened to each other, they hold the bottom and top parts and recording media hubs together, in which packaging container said bottom and top parts are square-form panels having four corners and said central openings, and wherein means for peripherally holding together said number of wound-up recording media and said bottom and top parts are provided, comprising four identically shaped container side parts, each side part consisting of two legs of an orthogonal open angle with an edge where the legs join, and each of the two legs being provided with upper and lower tabs extending perpendicular to said leg and in parallel to the bottom part and top parts, said four side parts having a width corresponding to the height of said assembled packaging container and, after being pushed with said tabs of their legs over the bottom and top parts with said magnetic recording media between them, holding the packaging container together peripherally.

2. A packaging container as claimed in claim 1, wherein the corners of the bottom and top parts, as well as the edges where the legs of the side parts join, are beveled.

3. A packaging container as claimed in claim 1, wherein projections are provided adjacent to the corners of the bottom and top parts, and opposite said projections there are provided depressions for stacking said bottom and top parts onto one another.

4. A packaging container as claimed in claim 1 wherein projections are provided adjacent to the corners of the bottom and top parts in order to bound the inner space of the packaging container for said wound-up magnetic recording media therein.

5. A packaging container as claimed in claim 1, wherein said support means is a hollow cylindrical sleeve and said fastening ring is a snap ring to be placed onto the open end of said sleeve and locked thereto.

* * * * *